United States Patent [19]

Bohler et al.

[11] 4,308,774

[45] Jan. 5, 1982

[54] HOLE CUTTING DEVICE FOR WEBS

[75] Inventors: Gerard M. Bohler, Pine Grove; Edward D. Reed, Friedensburg; Victor A. Kowalski, Pottsville, all of Pa.

[73] Assignee: Allied Corporation, Morris Township, Morris County, N.J.

[21] Appl. No.: 136,205

[22] Filed: Apr. 1, 1980

[51] Int. Cl.[3] .......................... B26D 7/18; B29C 17/10

[52] U.S. Cl. .......................................... 83/100; 83/53; 83/177; 83/309; 83/152; 83/374

[58] Field of Search ................... 83/100, 177, 53, 308, 83/309, 152, 276, 374

[56] References Cited

U.S. PATENT DOCUMENTS

| | | | |
|---|---|---|---|
| 2,182,744 | 12/1939 | Ehrsam | 83/100 |
| 3,269,242 | 8/1966 | Hooper et al. | 83/276 |
| 4,160,396 | 7/1979 | Matzner et al. | 83/100 |
| 4,249,438 | 2/1981 | Kelley | 83/53 |

*Primary Examiner*—Donald R. Schran
*Attorney, Agent, or Firm*—Patrick L. Henry

[57] ABSTRACT

A device for cutting a hole out of a moving web such as plastic film comprising a suction cup for pulling the film against a vacuum source, terminating in a knife edge contained within the suction cup to cut the hole out of the film.

6 Claims, 5 Drawing Figures

HOLE CUTTING DEVICE FOR WEBS

DESCRIPTION

BACKGROUND OF THE INVENTION

1. Field of the Invention

This invention relates to an improved web hole cutting device.

2. Description of the Prior Art

Web perforating systems have been developed to perforate or cut holes in webbing such as film. Known commercial devices comprise a puncher and a back-up plate or die to cut a hole out of the moving film. Such devices tend to be cumbersome and expensive. These devices also present safety problems for the operators and waste disposal problems for cut out holes.

BRIEF SUMMARY OF THE INVENTION

In accordance with this invention, there is provided a device for making holes in a continuously moving web comprising:

a. vacuum tube means;
b. a cutting edge;
c. a suction cup surrounding said vacuum tube;
d. a vacuum source to apply negative pressure to the vacuum tube;

whereby vacuum pulls the film against the suction cup which collapses, allowing the film to be pulled against the knife edge thereby perforating the film.

In a presently preferred embodiment, there is provided a device for making holes in a continuously moving web including;

a. a hollow flexible vacuum tube means terminating in a cutting edge;
b. a suction cup surrounding said vacuum tube;
c. a vacuum source to apply negative pressure to the vacuum tube;
d. timing means for controlling the supply of vacuum to the tube;
e. a filter cup between the vacuum source and the cutting edge;

whereby the timing means initially creates a vacuum pulling the film against the suction cup, allowing the film to be pulled against the knife edge thereby perforating the film, and the vacuum pulling the punched out chip through the tubing into the filter means; the timing means thereafter disconnecting the vacuum to allow disengagement of the suction cup from the film.

DETAILED DESCRIPTION OF THE INVENTION

Figure 1:
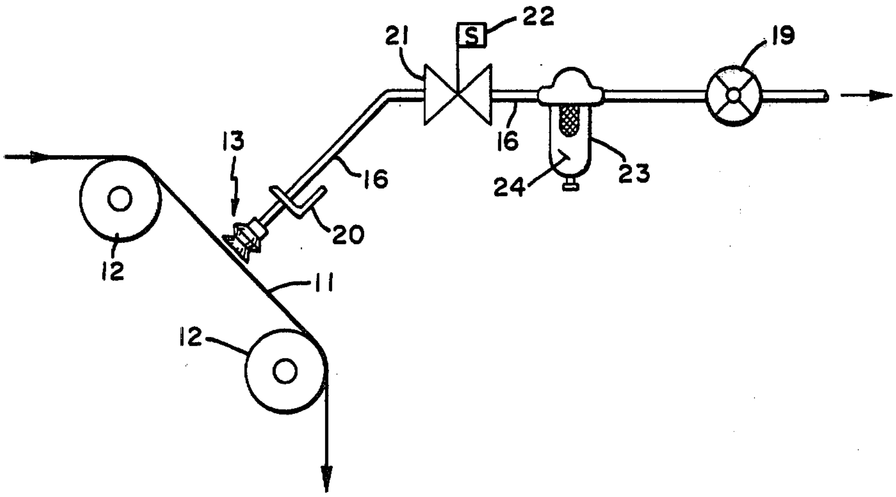
FIG. 1 is a schematic view of the hole cutter device of the present invention.

Referring to FIG. 1, a web such as plastic film 11 supported on rolls 12 is continuously moving past hole cutter 13.

Figure 2:
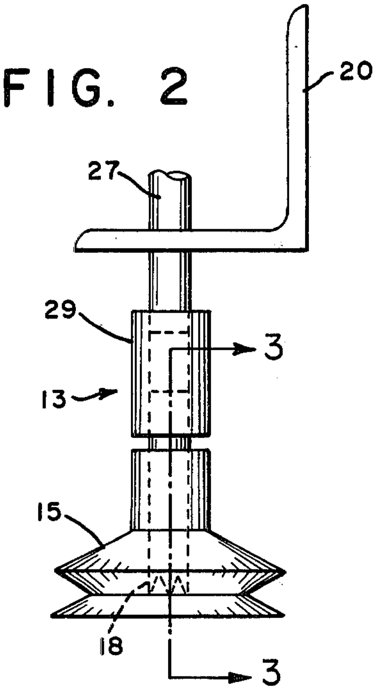
FIG. 2 is an elevational view of the suction cup and knife edge.
Figure 3:
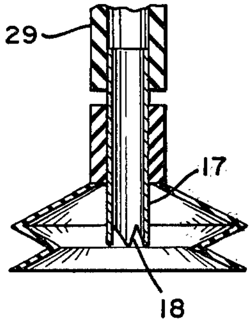
FIG. 3 is a sectional view taken on line 3—3 of FIG. 1.
Figure 4:
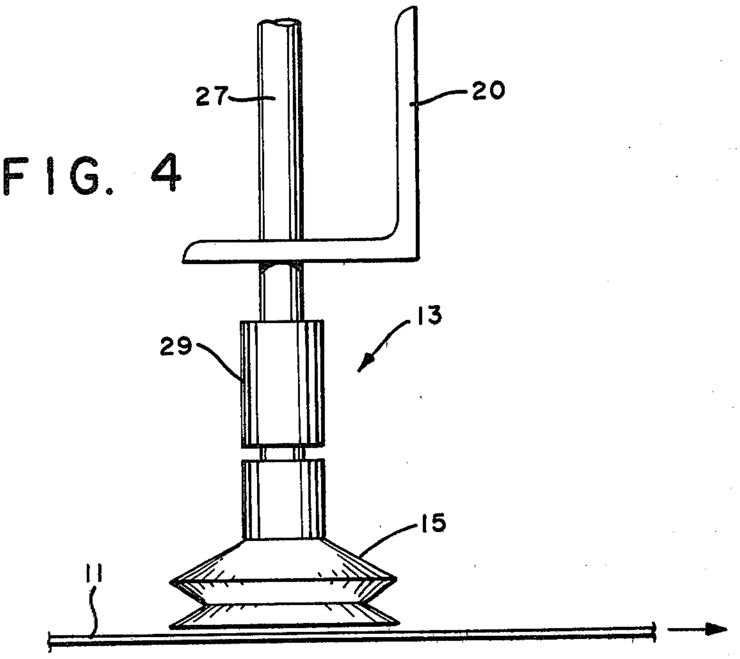
FIG. 4 is an elevational view of a continuously moving web, with the hole cutter in inoperative position.
Figure 5:
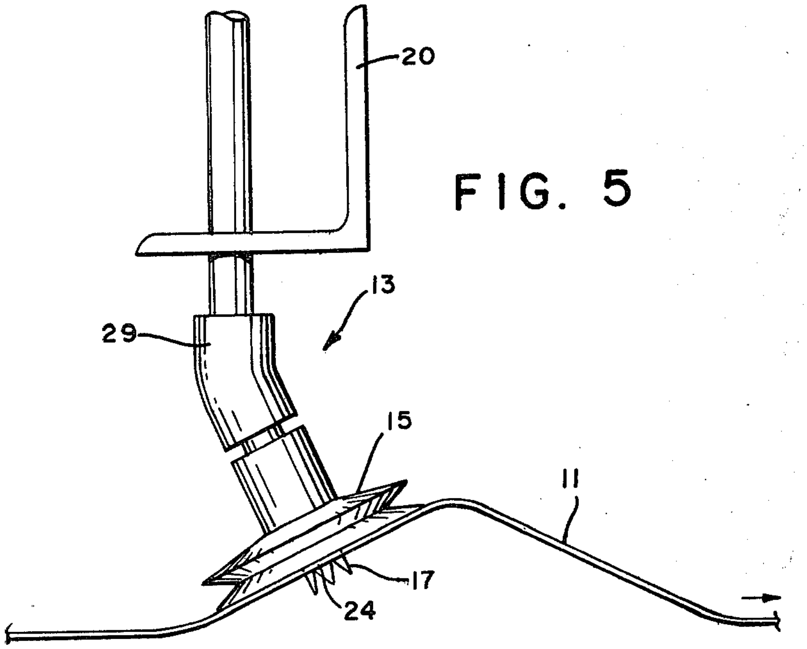
FIG. 5 is an elevational view of a continuously moving web and the hole cutter in its operative (cutting) mode.

Referring to FIG. 2, the hole cutter 13 comprises a flexible accordian suction cup 15 surrounding a vacuum line 16 terminating in cutting edge 17. The cutting edge is circular and comprises saw teeth 18 to facilitate the cutting of the film. The vacuum line 16 comprises at least in part a flexible rubber tubing portion 29 and is in communication with vacuum pump 19. The hole cutter assembly 13 is supported on bracket 20.

In the line between the hole cutter 13 and vacuum pump 19, there are a solenoid valve 21 actuated by timer 22, and an air filter cup 23. Timer 22 actuates the solenoid valve 21 to alternately vent vacuum line 16 to the atmosphere and vacuum pump 19. Air filter cup 23 collects the chips 24 punched from film 11 for later disposal.

In operation, the hole cutter operates in the following manner. The vacuum pump 19 operates continuously maintaining a 20" Hg vacuum on the air filter cup 23 and line 16 to the solenoid valve 21. The solenoid valve 21 is actuated by a continuous timer 22 which opens valve 21 for 0.1 second duration. The cycle time between valve openings is adjustable, which determines the distance between consecutive holes in the film.

When the solenoid valve 21 opens, evacuating the lower end of line 16 and suction cup 15, the film 11 is pulled against suction cup 15. Cup 15 collapses, pulling the film against cutting edge 17 which cuts a hole in film 11. The punched out chip 24 is pulled through the vacuum line 16 into filter cup 23. The flexible rubber tubing 18 between the cutter and rigid portion 27 of vacuum line 16 allows movement of the cutting edge 17 and suction cup with the continuous movement of the film, and provides for relatively no movement between the film and the hole cutter during the cutting portion of the cycle.

The invention finds particular utility when used to cut holes in thin flexible plastic film ranging from 0.0005 to 0.005 inches thickness.

From the above it can be seen that the present invention provides for a hole cutter for continuously moving webbing that: is very simple to construct, has no moving parts, eliminates a potential safety hazard for workers, has a long life expectancy, is easy to mount on the film machine, and contains the waste cut out chips.

It is understood that variations and modifications of the present invention may be made without departing from the scope of the invention. It is also to be understood that the scope of the invention is not to be interpreted as limited to the specific embodiment described herein, but only in accordance with the appended claims when read in light of the foregoing disclosure.

We claim:

1. Device for cutting holes in a continuously moving web including:

a. a hollow flexible vacuum tube means terminating in a cutting edge;
b. a suction cup surrounding said vacuum tube;
c. a vacuum source to apply negative pressure to the vacuum tube;
d. timing means and valve means for controlling the supply of vacuum to the tube;
e. a filter cup between the vacuum source and the cutting edge;

whereby the timing means and valve means initially create a vacuum, pulling the web against the suction cup, allowing the web to be pulled against the knife edge, thereby perforating the web, and the vacuum pulls the punched out chip through the tubing into the filter means; and the timing means and valve means, thereafter disconnecting the vacuum to allow disengagement of the suction cup from the web.

2. Device of claim 1, wherein the flexible vacuum tube bends during the cutting operation thereby allowing the suction cup and cutting edge to move along with the web.

3. Device of claim 2, wherein the cutting edge is a circular saw tooth edge.

4. Device for cutting holes in a continuously moving web comprising:

a. vacuum line means;

b. a suction cup connected to said vacuum line means;

c. a vacuum source to apply negative pressure to the vacuum tube;

d. a cutting edge within said suction cup and also connected to said vacuum line means;

whereby vacuum pulls the film against the suction cup allowing the film to be pulled against the cutting edge, thereby perforating the film, and the perforate is withdrawn through the cutting edge.

5. Device of claim 4, wherein the vacuum line comprises a flexible portion adjacent the suction cup, thereby allowing the suction cup and cutting edge to move along with the film during the hole cutting step.

6. Device of claim 5, further comprising timing means and valve means for alternately venting the vacuum line to the vacuum pump and the atmosphere, and an air filter cup in the vacuum line to collect the chip cut out to form the hole.

* * * * *